P. BROWN.

CAR BRAKE.

APPLICATION FILED JUNE 28, 1913.

Reissued Aug. 24, 1915.

13,965.

2 SHEETS—SHEET 1.

Witnesses

R. H. Brown

W. A. Williams

Inventor

Perry Brown

By Robertson & Johnson

Attorneys.

P. BROWN.
CAR BRAKE.
APPLICATION FILED JUNE 28, 1913.
Reissued Aug. 24, 1915.
13,965.
2 SHEETS—SHEET 2.
Fig. 6.
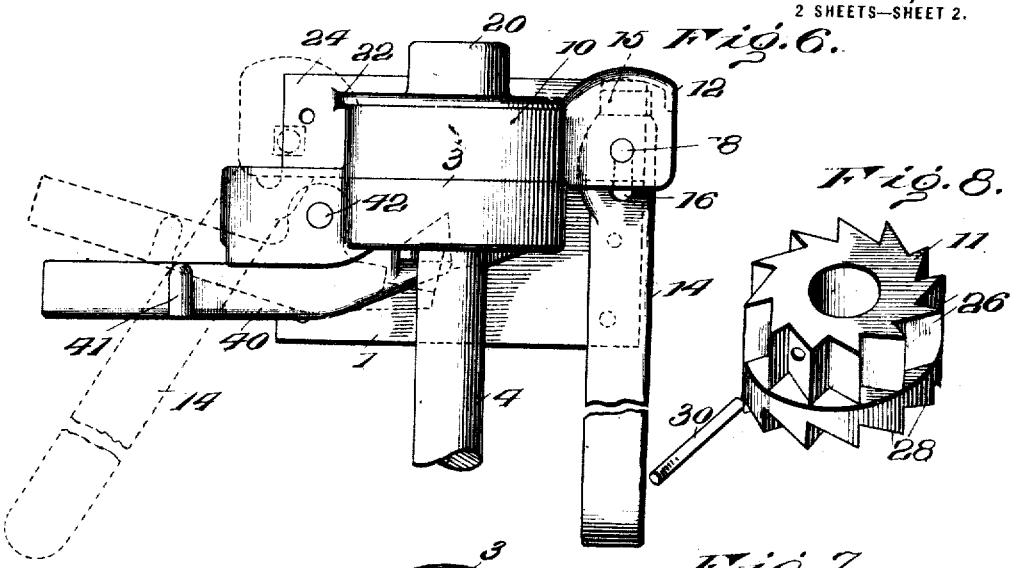
Fig. 8.
Fig. 7.
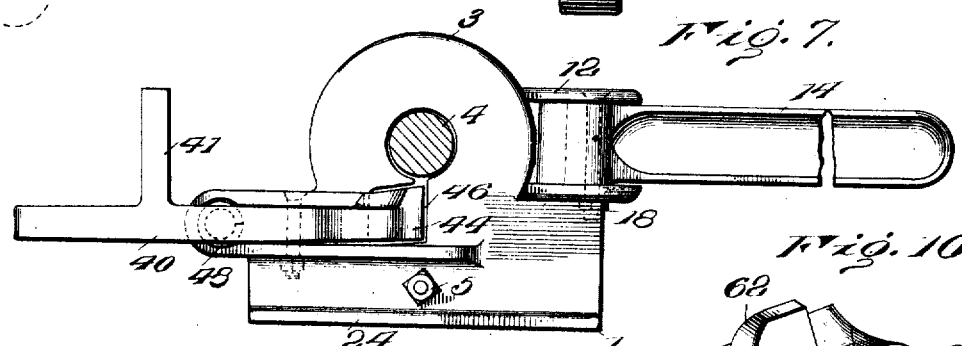
Fig. 10.
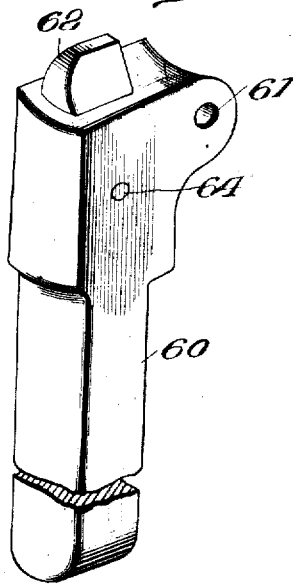
Fig. 9.
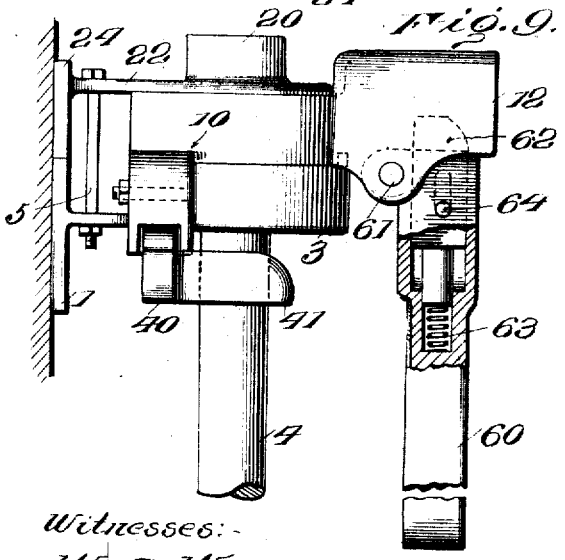
Witnesses:-
W. A. Williams
R. W. Brown
Inventor.
Perry Brown
by Wharton & Johnson
Attorneys.

UNITED STATES PATENT OFFICE.

PERRY BROWN, OF CORAOPOLIS, PENNSYLVANIA.

CAR-BRAKE.

13,965. Specification of Reissued Letters Patent. Reissued Aug. 24, 1915.

Original No. 1,037,120, dated August 27, 1912, Serial No. 667,244. Application for reissue filed June 28, 1913. Serial No. 776,448.

*To all whom it may concern:*

Be it known that I, PERRY BROWN, a citizen of the United States of America, and a resident of Coraopolis, in the county of Allegheny and State of Pennsylvania, (whose post-office address is 1507 Fifth avenue, Coraopolis, Pennsylvania, aforesaid,) have invented certain new and useful Improvements in Car-Brakes, of which the following is a specification.

This invention relates to brakes for railway cars and more particularly to hand operated brakes adapted to be secured to the ends of freight cars, although capable of use on other cars, and the object of the invention is to construct a brake which is capable of use on the ordinary vertical staff but which will contain all the operating parts in compact relation with each other, said parts having very little work and being capable of ready assembling, and also of such character that the parts will hang by gravity in the positions where they will occupy the least amount of space.

The invention consists of the combination and arrangement of parts shown, in their preferable embodiment, in the accompanying drawings and as hereinafter described and claimed.

Figure 1:
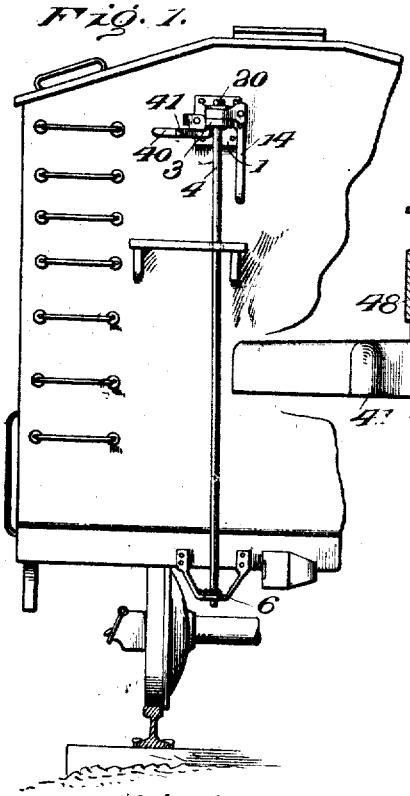
Figure 2:
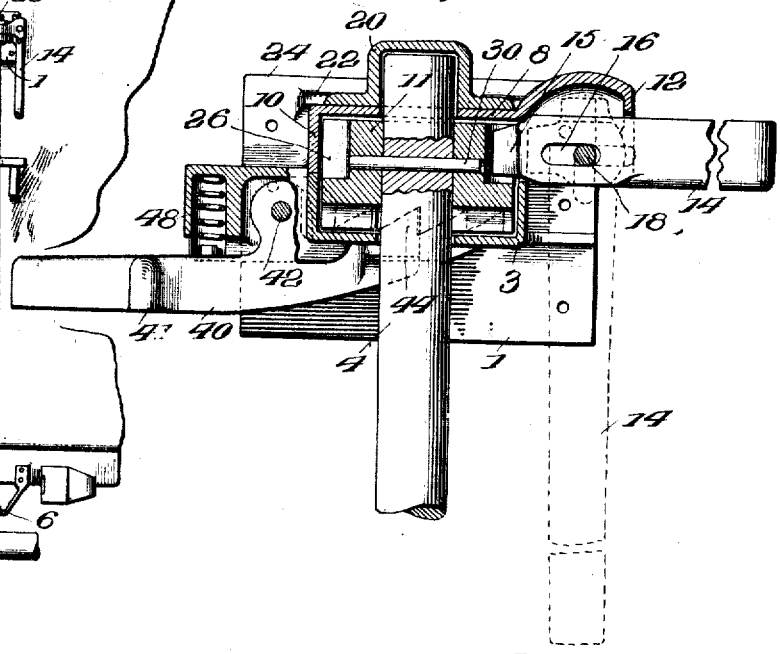
Figure 3:
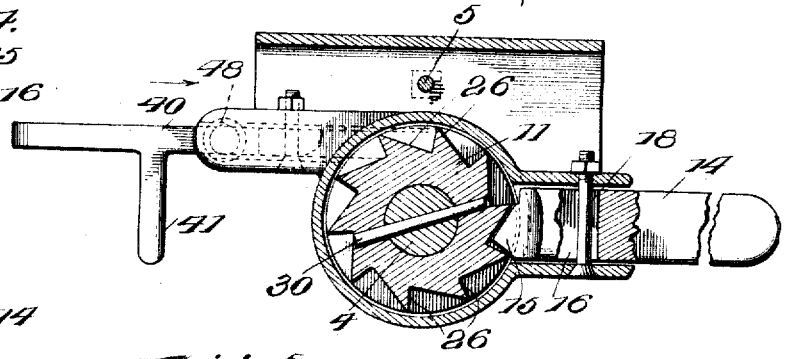
Figure 4:
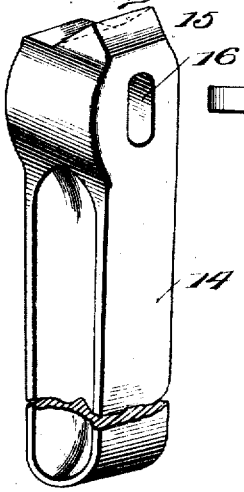
Figure 5:
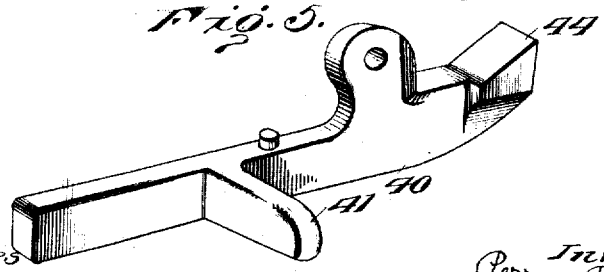

In the aforesaid drawings: Figure 1 is an end view of part of a car having my invention applied thereto. Fig. 2 is a vertical central section of the parts comprising my invention. Fig. 3 is a horizontal section of the same. Figs. 4 and 5 are perspective views respectively of the handle and a pawl. Fig. 6 is a side elevation of the parts shown in Fig. 2. Fig. 7 is a bottom plan view of Fig. 6. Fig. 8 is a perspective view of the ratchet wheel. Fig. 9 is a side elevation of a modified form. Fig. 10 is a perspective view of a handle made as illustrated in Fig. 9.

Referring now to the details of the drawings by numerals: 1 designates a frame preferably of malleable casting which is adapted to be secured to the end or any other portion of a car and has formed, preferably integrally therewith, an annular ring 3 through which projects an axle 4 which in the embodiment shown in my drawings, forms the usual vertical staff to which the ordinary brake chains 6 are connected. Located above the annular ring 3 is a member 8 having an annular portion 10 which, when in position, forms a continuation of the annular ring 3 to form a pocket or housing for a ratchet wheel 11 to be described. The member 8 is provided with an offset 12 within which is located the operating end of a lever or handle 14, said lever having a slot 16 through which projects a pivotal pin 18, the purpose of the slot to be hereinafter described. The axle 4 passes through the annular ring 3 and the coinciding member 8 and its upper end projects into a bearing formed in the cap 20 projecting from a cast frame 22 having a flange 24 which is arranged in line with the flange of the main frame 1 and which likewise is arranged to be secured to the end of the car, the cap 20 not only forming a bearing but also forming a housing for the upper end of the axle 4. The aforesaid ratchet wheel 11, which is illustrated in perspective view in Fig. 8, has two sets of teeth arranged at right angles to each other, one set being numbered 26 and the other set 28, and said ratchet wheel is secured to the axle 4 by means of a pin 30 so that whenever the ratchet wheel 11 is rotated, said shaft 4 is also rotated, in a manner well understood. The lever or handle 14 is for the purpose of imparting movement to this ratchet wheel 11 and therefore to the axle 4 and yet the lever or handle is arranged so that it will, by gravity, assume the inoperative position as designated in dotted lines in Fig. 2 and in full lines in Fig. 6. The lever or handle 14 is therefore provided with the slot 16 hereinbefore referred to so that when the operator wishes to apply the brakes, he can grasp the lever or handle 14 and move it upward to the position shown in full lines in Fig. 2 and in so doing, it will automatically move to the limit of the slot 16 so that the tooth 15 of the lever or handle 14 will engage the upper set of teeth 26 whereby, when the handle is rotated with the axis of the axle 4 as a center, the tooth 15 will engage the teeth 26 and the movement of the lever 14 will be imparted to the ratchet wheel 11 and to its axle 4.

In order to hold the axle 4 in the position to which it is moved by the operator as just described, I employ a pawl 40 pivoted to the under side of the frame 1 on a pin 42, the pawl having a tooth 44 which projects through an opening 46 in the bottom of the annular member 3 to engage the teeth 28 on the bottom of the ratchet 11. When the parts are in the position indicated in Fig. 2, the longer end of the lever 40 is sufficient to hold the teeth 44 in proper working relation with the teeth 28 of the ratchet wheel 11, by gravity, but a spring 48 is employed which tends to force the pawl 40 in its proper working position so that if the device is used with the axle 4 in a horizontal position, the parts will still be operative. It is evident that it is only necessary to move upward the outer end of the pawl 40 in order to release the ratchet wheel 11 when it is desired to release the brakes. If, in the operation of the brake, the aforesaid pawl 40 sticks, or is held so securely by the ratchet wheel that the operator finds it difficult to release the pawl, he may move the handle or lever 14 until it is directly under the projection 41 on the pawl 40, see Fig. 6, when this handle may be given an upward movement and the operator will find the leverage of the handle sufficient to dislodge the pawl to release its ratchet wheel.

A modified form of handle is illustrated in Figs. 9 and 10 where, instead of having a handle provided with a slot as 16 in Fig. 2, I employ a handle 60 pivoted at 61 so that the handle will drop by gravity to the position shown in Fig. 9. This form of handle is preferably provided with a pawl 62 which is pressed outwardly by a spring 63 shown in Fig. 9, the pawl 62 being provided with a slot (shown in dotted lines in Fig. 9) through which is inserted a pin 64 to limit the movement of the pawl 62 in a manner obvious from the drawings. It will be manifest that when this kind of lever 60 is employed the lever may be moved with respect to the ratchet wheel 11, while the lever is in a horizontal position, the spring actuated pawl 62 moving backward into the handle as it passes each tooth.

The parts forming my invention may be assembled in a very easy manner as will be seen from the following: The ratchet wheel 11 shown in Fig. 8 is secured to the axle 4 by means of the pin 30, either before or after the axle 4 is inserted through the opening in the bottom of the annular ring shaped member 3 forming part of the frame 1; then the annular portion 10 with the handle 14 pivotally secured thereto is placed in position with its annular portion 10 fitting over the ratchet wheel 11 and joining the lower annular shaped member 3 as indicated in Figs. 2 and 6. Then the cap 20 is placed on the upper end of the axle 4 with its flange 24 in line with the flange on the main frame 1, a bolt 5 being employed to secure the cast frame 22 to the main frame 1, this bolt being illustrated in Figs. 3, 7 and 9. Then the device is ready to be riveted or bolted to the end of the car. The pawl 40 may be secured in position either before or after the ratchet wheel is placed in the pocket formed by the annular member 3 by inserting said pawl in position and securing it there by driving the pin or bolt 42 as illustrated in the position shown in Figs. 2 and 3.

From the foregoing and accompanying drawings, it will be seen that I have invented a simple form of brake well adapted to be secured to freight cars and to meet the rigid requirements now demanded. It will also be seen that I have provided a brake wherein a frame is employed which has formed on or connected with it an annular shaped member with which co-acts a similar annular shaped member to which the brake handle or lever is connected or pivoted, these two annular members forming a housing within which the ratchet wheel is located. And in the preferred embodiment of my invention, the ratchet wheel is provided with two sets of teeth, one of which is acted on by the lever which projects through the movable annular shaped member and the other set of teeth has co-acting with it a pawl which projects through the fixed annular shaped member. While I have thus described the preferable embodiment of my invention, it is manifest that changes may be made without departing from the spirit of my invention, the scope of which is set forth in the appended claims.

What I claim as my invention is:

1. In a brake, a frame having a recessed member projecting therefrom, a second recessed member adjacent to the member projecting from the frame but rotatable with respect therewith, said recessed members forming a housing for a ratchet wheel, a ratchet wheel located within said recessed members, a handle or lever connected with the movable member and adapted to co-act with said ratchet wheel, an axle passing through said movable member and having the ratchet wheel secured thereto, and a plate having a cap forming a bearing for the end of said axle.

2. In a brake, a frame having a flange adapted to be secured to part of a car and having a recessed member projecting therefrom, a second member adjacent to the first recessed member and rotatable with respect therewith, said members forming a housing for a ratchet wheel, an axle passing through said movable members and having the ratchet wheel secured thereto, the ratchet wheel being located within the housing formed by said recessed members, a second frame having a flange adapted to be secured to part of a car and having a cap forming a bearing for the end of the aforesaid axle, and a handle or lever connected with the movable member and adapted to co-act with said ratchet wheel for the purpose of turning the same and said axle.

3. In a brake, a frame having a flange adapted to be secured to part of a car and having a recessed member projecting therefrom, a second member adjacent to the first recessed member and rotatable with respect therewith, said members forming a housing for a ratchet wheel, an axle passing through said movable member and having the ratchet wheel secured thereto, the ratchet wheel being located within the housing formed by said recessed members, a second frame having a flange adapted to be secured to part of a car and having a cap forming a bearing for the en of the aforesaid axle, a handle or lever connected with the movable member and adapted to co-act with said ratchet wheel for the purpose of turning the same and said axle, and a pawl pivotally supported with respect to the said fixed recessed member and co-acting with said ratchet wheel to hold the same.

4. In a brake, a frame having a recessed member, a second recessed member adjacent to the first recessed member but movable with respect thereto, a ratchet wheel located between said recessed members, the second recessed member having a socket formed thereon, and a handle pivotally supported in said socket and adapted when held in one position to co-act with the ratchet wheel to move the same.

5. In a brake, a frame provided with a recessed member, a second recessed member rotatably secured in juxtaposition to the first recessed member, an axle, a ratchet wheel fixed to said axle and located within the housing formed by said recessed members, the movable recessed member having a socket projecting therefrom and rotatable with said recessed member, and a handle pivotally supported by said socket whereby when the handle is in one position, its end co-acts with the ratchet wheel to rotate the same and the aforesaid axle.

6. In a brake, a frame provided with a recessed member, a second recessed member rotatably secured in juxtaposition to the first recessed member, an axle, a ratchet wheel fixed to said axle and located within the housing formed by said recessed members, the movable recessed member having a socket projecting therefrom and rotatable with said recessed member, and a handle pivotally supported by said socket whereby when the handle is in one position, its end co-acts with the ratchet wheel to rotate the same and the aforesaid axle, the pivot on which the handle is supported in said socket being at right angles to the axle whereby when said axle is in a vertical position the handle will by gravity fall parallel therewith.

7. In a brake, a frame having a recessed member, a second recessed member adjacent to the first recessed member but movable with respect thereto, a ratchet wheel located between said recessed members, the second recessed member having a socket formed thereon, and a handle pivotally supported in said socket and adapted when held in one position to co-act with the ratchet wheel to move the same and when moved on its pivot to release said ratchet wheel.

8. In a brake, a frame having a recessed member, a second recessed member adjacent to the first recessed member but movable with respect thereto, a ratchet wheel located between said recessed members, the second recessed member having a socket formed thereon, and a handle pivotally supported in said socket and movable on the pivot to assume two positions, in one of which the handle co-acts with said ratchet wheel to move the same and when in the other position to release said ratchet wheel.

9. In a brake, a frame having a recessed member, a second recessed member adjacent to the first recessed member but movable with respect thereto, a ratchet wheel located between said recessed members, the second recessed member having a socket formed thereon, a handle pivotally supported in said socket and movable on the pivot to assume two positions, in one of which the handle co-acts with said ratchet wheel to move the same and when in the other position to release said ratchet wheel, and a pawl co-acting with said ratchet wheel to hold the same.

10. In a brake, a frame having a recessed member, a second recessed member adjacent to the first recessed member but movable with respect thereto, a ratchet wheel located between said recessed members, the second recessed member having a socket formed thereon, a handle pivotally supported in said socket and movable on the pivot to assume two positions, in one of which the handle co-acts with said ratchet wheel to move the same and when in the other position to release said ratchet wheel, and a pawl pivotally supported with respect to said fixed recessed member and co-acting with said ratchet wheel to hold the same.

11. In a brake, a frame having a recessed member, a second recessed member adjacent to the first recessed member but movable with respect thereto, a ratchet wheel located between said recessed members, the second recessed member having a socket formed thereon, a handle pivotally supported in said socket and adapted to co-act with the ratchet wheel, and a pawl pivotally supported in operative relation with the first recessed member and said ratchet wheel to hold the latter.

12. In a brake, a frame having a recessed member, a second recessed member adjacent to the first recessed member but movable with respect thereto, a ratchet wheel located between said recessed members, the second recessed member having a socket formed thereon, a handle pivotally supported in said socket and adapted to co-act with the ratchet wheel, and a pawl pivotally supported in operative relation with the first recessed member and said ratchet wheel to hold the latter, said handle being movable under the end of said pawl whereby the handle may be used to release the pawl from the ratchet.

13. In a brake, a frame having a recessed member, a second recessed member adjacent to the first recessed member but movable with respect thereto, a ratchet wheel located between said recessed members, the second recessed member having a socket formed thereon, and a handle pivotally supported in said socket and having a sliding connection on its pivot whereby the handle may be moved inward on the pivot to engage the ratchet teeth and outward to release the ratchet wheel, and may be moved on the pivot as a center.

14. In a brake, a frame having a recessed member projecting therefrom, a second recessed member adjacent to the member projecting from the frame but movable with respect thereto, said recessed members forming a housing for a ratchet wheel, and a ratchet wheel located within said recessed members having two sets of teeth thereon, a handle or lever projecting through the movable member and adapted to co-act with one set of ratchet teeth, and a pawl co-acting with the second set of ratchet teeth.

15. In a brake, a frame adapted to be secured to part of a car and having a recessed member projecting therefrom, a second recessed member adjacent to the first mentioned recessed member but movable with respect thereto, said recessed members forming a housing for a ratchet wheel, a ratchet wheel located within said recessed members having two sets of teeth thereon, one set on the periphery of the wheel and one set on the flat side of the wheel, a handle or lever carried by said movable recessed member and adapted to engage the teeth on the periphery of said ratchet wheel, and a pawl pivotally supported with respect to the fixed recessed member and adapted to project through the same and engage the teeth on the flat side of the ratchet wheel.

16. In a brake, a brake shaft, a ratchet wheel fixed to and rotatable with said shaft, a member journaled on said shaft, an operating lever or handle pivotally supported on said member and arranged to be moved to co-act with said ratchet wheel and to drop by gravity to release said ratchet wheel, and a pawl co-acting with said ratchet wheel to hold the brake shaft against counter-rotation, whereby said lever may be moved upon its pivot to cause said ratchet wheel to rotate the brake shaft, and the pawl co-act with said ratchet wheel to hold said shaft when moved by the lever.

17. In a brake, a brake shaft, a ratchet wheel fixed to and rotatable with said shaft, a member journaled on said shaft rotatable with respect to said shaft but having no movement longitudinally of the shaft, an operating lever or handle pivotally supported on said member and arranged to be moved to co-act with said ratchet wheel and to drop by gravity to release said ratchet wheel, and a pawl co-acting with said ratchet wheel to hold the brake shaft against counter-rotation, whereby said lever may be moved upon its pivot to cause said ratchet wheel to rotate the brake shaft, and the pawl co-act with said ratchet wheel to hold said shaft when moved by the lever.

18. In a brake, a brake shaft, a ratchet wheel fixed to and rotatable with said shaft, a member journaled on said shaft, an element arranged to engage said ratchet wheel, an operating lever or handle pivotally supported on said member and arranged to be moved to cause said element to move into engagement with said ratchet wheel and to drop by gravity so that said element will release said ratchet wheel, and a pawl co-acting with said ratchet wheel to hold the brake shaft against counter-rotation whereby said lever may be moved upon its pivot to cause said ratchet wheel to rotate the brake shaft, and the pawl co-act with said ratchet wheel to hold said shaft when moved by the lever.

19. In a brake, a brake shaft, a ratchet wheel fixed to and rotatable with said shaft, a member journaled on said shaft rotatable with respect to said shaft but having no movement longitudinally of the shaft, an element arranged to engage said ratchet wheel, an operating lever or handle pivotally supported on said member and arranged to be moved to cause said element to move into engagement with said ratchet wheel and to drop by gravity so that said element will release said ratchet wheel, and a pawl co-acting with said ratchet wheel to hold the brake shaft against counter-rotation whereby said lever may be moved upon its pivot to cause said ratchet wheel to rotate the brake shaft, and the pawl co-act with said ratchet wheel to hold said shaft when moved by the lever.

20. In a brake, a brake shaft, two members one of which is movable with respect to the other, a ratchet wheel located between said members and connected with said shaft, an operating lever or handle pivotally supported on the aforesaid movable member and co-acting with the ratchet wheel between said members, and a pawl entering the space between said members and adapted to hold the shaft when moved by said lever or handle.

21. The combination in a brake, a shaft, a member fixed thereto so as to rotate therewith, said member having two sets of ratchet teeth, a second member journaled on said shaft, a handle pivotally connected with said second member and located adjacent to said shaft and arranged to drop by gravity to a vertical position, a pawl arranged to co-act with one set of said ratchet teeth and hold the shaft from rotating backward, and an element arranged to engage the other set of ratchet teeth, and said handle being arranged when elevated to a horizontal position to cause said element to engage the second set of ratchet teeth, whereby the shaft may be rotated.

22. In a brake, a brake shaft, a casing, two sets of ratchet teeth in said casing one set at right angles to the other, a handle or lever co-acting with one set of ratchet teeth and arranged to drop by gravity to disengage said teeth, and a pawl co-acting with the other set of ratchet teeth, whereby said lever may be moved to rotate the brake shaft and the pawl co-act to hold said shaft when moved.

23. In a brake, the combination of a bracket adapted to be secured to the end of a car, a shaft finding a bearing in said bracket, a member fixed to said shaft so as to rotate therewith and having two sets of ratchet teeth thereon, a second member journaled on said shaft, a handle pivotally connected with said second member and located adjacent to said shaft and arranged to drop by gravity to a vertical position, a pawl carried by said bracket and arranged to co-act with one set of said ratchet teeth and hold the shaft from rotating backward, and an element arranged to engage the other set of said ratchet teeth, said handle being arranged when elevated to a horizontal position to cause said element to engage the second set of ratchet teeth, whereby the shaft may be rotated.

24. In a brake, a brake shaft, two members ratchet teeth between said members con- co-acting with said brake shaft, two sets of nected with said shaft, a handle or lever co- acting with one set of said ratchet teeth and arranged to drop by gravity to disengage said teeth, and a pawl co-acting with the other set of ratchet teeth, whereby said lever may be moved to rotate the brake shaft and the pawl co-act to hold said shaft when moved.

25. In a brake, a brake shaft, two members co-acting with said brake shaft, two sets of ratchet teeth between said members connected with said shaft, one set of ratchet teeth being at right angles to the other, a handle or lever co-acting with one set of said ratchet teeth and arranged to drop by gravity to disengage said teeth, and a pawl co-acting with the other set of ratchet teeth, whereby said lever may be moved to rotate the brake shaft and the pawl co-act to hold said shaft when moved.

26. In a brake, a brake shaft, a casing, a ratchet wheel in said casing fixed to said shaft so as to rotate therewith, an operating lever or handle pivotally supported with respect to said casing and shaft and arranged to be moved to co-act with said ratchet wheel and to drop by gravity to release said ratchet wheel, and a pawl entering the casing and co-acting with said ratchet wheel to hold the brake shaft, whereby said lever may be moved upon its pivot to co-act with said ratchet wheel to rotate the same and its brake shaft, and the pawl co-act to hold said shaft when moved by said handle, said pawl having a handle acting as a weight to hold the pawl in active position.

27. In a brake, a brake shaft, a casing, a ratchet wheel in said casing fixed to said shaft so as to rotate therewith, an operating lever or handle pivoted to part of said casing and arranged to be moved to co-act with said ratchet wheel and to drop by gravity to release said ratchet wheel, and a pawl entering the casing and co-acting with the ratchet wheel therein to hold the brake shaft, whereby said lever may be moved upon its pivot as before stated to co-act with said ratchet wheel to rotate the same and its brake shaft, and the pawl co-act with said ratchet wheel to hold said shaft when moved by said handle, said pawl having a handle acting as a weight to hold the pawl in active engagement with said ratchet wheel.

28. In a brake, a brake shaft, two members one of which is movable with respect to the other and one of which is recessed, a ratchet wheel located in said recess and connected with said shaft, a handle or lever pivoted to said movable member and adapted when moved on its pivot to co-act with the ratchet wheel to rotate said shaft, and a pawl entering the space between said members and adapted to hold the shaft.

29. In a brake, a brake shaft, two members one of which is movable with said shaft and one of which is recessed, a ratchet wheel located in said recess and connected with said shaft, a handle or lever pivoted to said movable member and adapted when moved on its pivot to co-act with the ratchet wheel to rotate said shaft, and a pawl entering the space between said members and adapted to hold the shaft, said pawl having a handle acting as a weight to hold said pawl in active engagement.

30. In a brake, a brake shaft, two members one of which is movable with said shaft and one of which is recessed, two sets of ratchet teeth connected with said shaft and located in said recess, a handle or lever pivoted to said movable member and adapted when moved to co-act with one set of said ratchet teeth to rotate said shaft, and a pawl entering the space between said members and co-acting with the other set of ratchet teeth.

31. In a brake, a brake shaft, two members one of which is movable with said shaft and one of which is recessed, two sets of ratchet teeth connected with said shaft and located in said recess, a handle or lever supported by said movable member and adapted when moved to co-act with one set of said ratchet teeth to rotate said shaft, and a pawl entering the space between said members and co-acting with the other set of ratchet teeth, said pawl having a handle acting as a weight to hold the pawl in active engagement with its ratchet teeth.

32. In a brake, a brake shaft, a casing, a double ratchet wheel located in said casing and connected with said shaft, a handle or lever adapted to co-act with one part of said ratchet wheel to rotate the brake shaft, and a pawl acting against the other face of said ratchet wheel to hold the brake shaft when moved, said handle or lever being movable in a position to strike the pawl and move it to release the brake shaft.

33. In a brake, a brake shaft, two members, a double ratchet wheel located between said members and connected with one part of said shaft, a handle or lever adapted to co-act with said ratchet wheel to rotate said shaft, and a pawl co-acting with the other face of said ratchet wheel to hold the brake shaft when moved, said handle or lever being movable in a position to strike the locking device and pawl and move the same to release said shaft.

34. In a brake, a brake shaft, two members one of which is movable, a ratchet wheel located between said members and connected with said shaft, a handle or lever connected with said movable member and adapted to co-act with said ratchet wheel to rotate said shaft, and a pawl adapted to hold the brake shaft when moved, said handle or lever being movable in a position to strike the locking device and pawl and move the same to release said shaft.

35. In a brake, a brake shaft, a casing, two sets of ratchet teeth therein connected with said shaft, a handle or lever adapted to co-act with one of said ratchet teeth to rotate said shaft, and a pawl adapted to co-act with the other set of ratchet teeth to hold the brake shaft when moved, said handle or lever being movable in a position to strike the locking device and pawl and move the same to release said shaft.

PERRY BROWN.

Witnesses:
JOHN L. FLETCHER,
R. W. BROWN.

Correction in Reissue Letters Patent No. 13,965.

It is hereby certified that in reissue Letters Patent No. 13,965, granted August 24, 1915, upon the application of Perry Brown, of Coraopolis, Pennsylvania, for an improvement in "Car-Brakes," an error appears in the printed specification requiring correction as follows: Page 5, transpose lines 46 and 47; and that the saio Letters Patent should be read with this correction therein that the same may con form to the record of the case in the Patent Office.

Signed and sealed this 21st day of September, A. D., 1915.

[SEAL.]

J. T. NEWTON,

*Acting Commissioner of Patents.*